United States Patent [19]

Schuermann

[11] Patent Number: 5,270,717
[45] Date of Patent: Dec. 14, 1993

[54] EXTENDED RANGE RF-ID TRANSPONDER

[75] Inventor: Josef Schuermann, Oberhummel, Fed. Rep. of Germany

[73] Assignee: Texas Instruments Deutschland GmbH, Freising, Fed. Rep. of Germany

[21] Appl. No.: 858,247

[22] Filed: Mar. 26, 1992

[51] Int. Cl.⁵ .............................................. G01S 13/74
[52] U.S. Cl. ............................................. 342/22; 342/42
[58] Field of Search .......................... 342/22, 42, 51

[56] References Cited

U.S. PATENT DOCUMENTS 4,737,789  4/1988  Nysen ............................ 342/51
5,057,844 10/1991  Rothstein ....................... 342/51

Primary Examiner—T. H. Tubbesing
Attorney, Agent, or Firm—Rebecca A. Mapstone; James C. Kesterson; Richard L. Donaldson

[57] ABSTRACT

An extended range transponder/antenna configuration comprises a standard, state-of-the-art transponder which is coupled to a long and narrow antenna by a loosely coupled coil. The coupling of the coil to the transponder must be loose for a tuned type transponder in order to maintain the high "Q" and to avoid detuning and damping. Both effects of lowering the "Q" and detuning or damping the transponder would have an adverse effect on the receiving function of the transponder and the reading range of the transponder. The RF-ID efficiency of the arrangement is generally optimized for this type of application by the long but narrow antenna solution and by the simple fact that coupling an antenna to a transponder, amplifies the emission of the transponders signal relative to the noise, thus improving the signal-to-noise ratio of the RF-ID system. The fact that the width of the transponder loop antenna can be made very small eliminates, to a high degree, the noise impact on reading range with the result that a large reading range is maintained.

29 Claims, 1 Drawing Sheet

EXTENDED RANGE RF-ID TRANSPONDER

FIELD OF THE INVENTION

This invention relates to the extension of a planar and/or vertical reading range in existing interrogator-/transponder RF-ID systems and the modification of the shape of the inherent transponder or reader antenna pattern to better meet specific applications.

BACKGROUND OF THE INVENTION

Applications of RF-ID systems oftentimes require a read distance along a length that is considerably longer than the inherent reading distance of a single transponder. State-of-the-art transponders generally offer horizontal reading patterns of anywhere from 10 cm to 150 cm, depending upon the type of antenna and size. A typical example of an application which would require being able to read along a much greater distance would be when locating water or gas pipes, or buried cables or phone lines which lie underground.

Everyone is hesitant and instructed to exhibit great caution when digging in their own yard, for fear of digging into the ground and hitting a water pipe laid years prior by the water company or an electrical cable laid by the phone company. Blueprint drawings of the locations of these underground objects may be available, but may not always be completely accurate as to the exact location of the objects. A better alternative to locating these objects would be to have transponders located on the objects for remote identification ability. If, however, a standard state-of-the-art transponder is located on a 300 cm pipe underground, and a person is using a hand-held reader trying to locate that pipe, unless that person is holding the hand-held reader within approximately 40-50 cm from the location of the transponder on that 300 cm pipe, the reader will not detect the transponder.

Furthermore, it is not enough to know that the pipe has been identified to lie somewhere underground in the read area. Additional location and orientation information such as where does the pipe begin and end and in what direction does it lie with respect to the area of interest is also necessary. If, for example, a buried antenna not only provides a response along the length of a pipe, but also provides a wide antenna pattern on either side of the pipe, the orientation of the pipe would be difficult to exactly define. For example, large antennas do allow object detection or movement in both horizontal and vertical planes with some freedom, however, larger antennas also pick up an increased level of environmental interference signals or noise and thus reduce the actual reading range.

The objects to be identified do not have to be buried for this extension of the transponder read distance to be beneficial or necessary. There are many RF-ID applications in which a transponder with an extended reading range and a specific radiation pattern could benefit the system greatly. For example, when a transponder is located on any long or large object, similar to the buried pipes, the object will not be identified if the reader is further from the transponder than the maximum read distance of the transponder. In addition, since the transponders radiation pattern is somewhat symmetric around the transponder, a specific radiation pattern directed towards the reader may also be advantageous.

SUMMARY OF THE INVENTION

One object of the invention is to provide an extended range transponder/antenna configuration. This extended range transponder/antenna configuration comprises a standard, state-of-the-art transponder which is coupled to a long and narrow antenna by a loosely coupled coil. The coupling of the coil to the transponder must be loose for a tuned type transponder in order to maintain the high "Q" and to avoid detuning and damping. Both effects of lowering the "Q" and detuning or damping the transponder would have an adverse effect on the receiving function of the transponder and the reading range of the transponder. The RF-ID efficiency of the arrangement is generally optimized for this type of application by the long but narrow antenna solution and by the simple fact that coupling an antenna to a transponder, amplifies the emission of the transponders signal relative to the noise, thus improving the signal-to-noise ratio of the RF-ID system. The fact that the width of the transponder loop antenna can be made very small eliminates, to a high degree, the noise impact on reading range with the result that a large reading range is maintained.

Another advantage of the invention is the cost savings obtained by the implementation of the transponder/antenna configuration versus the several transponders it would take to perform the same read distance.

DETAILED DESCRIPTION OF THE PREFERRED EMBODIMENTS

Figure 1:
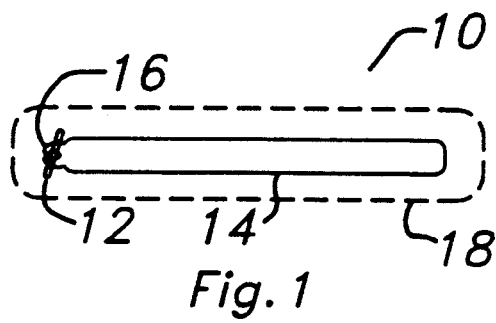
FIG. 1 shows the transponder/antenna configuration according to the invention.

FIG. 1 shows a first preferred embodiment of the extended range transponder/antenna arrangement 10. The transponder 12 is loosely coupled to the coil 16, which forms one end of the long and narrow antenna 14. The coil 16 consists of, for example, 3-4 windings, wound on an approximately 1.3 cm diameter to provide the loose coupling to the transponder 12 which is of smaller diameter. Although one example of providing loose coupling between the coupling coil and the transponder has been described, there are several methods in which to provide the loose coupling to the transponder as will be appreciated by those skilled in the art.

Figure 2:
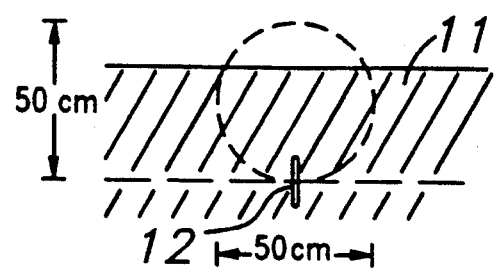
FIG. 2 shows a prior art transponder antenna pattern when buried in soil.

FIG. 2 shows a prior art, single state-of-the-art transponder 12 buried in soil 11 approximately 40 cm deep. With the transponder 12 vertically positioned, the vertical and horizontal reading range is approximately 50 cm. From a top view, looking down on the transponder 12, the reading pattern, shown by the dotted lines, is circular and may be approximately 50 cm in diameter.

Figure 3:
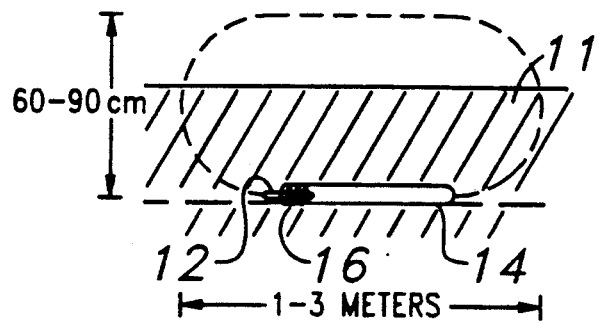
FIG. 3 shows a transponder/antenna arrangement antenna pattern when buried in soil according to the invention.

FIG. 3 shows a transponder/antenna arrangement 10 according to the invention. The transponder/antenna arrangement 10 is buried in the soil 11 at approximately the same depth as the transponder 12 in the prior art FIG. 2. The transponder 12, although shown in a horizontal position in FIG. 3, may be positioned in any direction because the coupling loop 16 acts as the transponders antenna not the transponder 12 itself. The horizontal reading pattern, shown by the dotted lines, has been extended along antenna loop 14 to a distance of approximately 1-3 meters while the vertical reading pattern has simultaneously increased to 60-90 cm.

Figure 4:
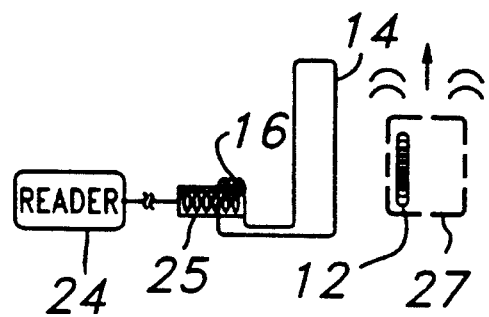
FIG. 4 shows a coupling coil/loop antenna arrangement which enhances the reading pattern of a reader according to the invention.

FIG. 4 shows how the coupling coil 16 and loop antenna 14 combination can also enhance a hand-held or stationary readers 24 reading performance in the same way that the transponders 12 reading performance is enhanced according to a preferred embodiment of the invention. Reader 24 has an antenna 25 with which it reads the transponder 12. For example, transponder 12 could be located on a moving object 27, which is moving by reader 24. Because the object 27 is moving very fast, the reader may have difficulty getting a reading on the transponder 12. However, with the addition of the coupling coil 16 and the loop antenna 14, the transponder 12 is able to send the identification code in the much more broad reader range offered by the loop antenna 14.

Figure 5:
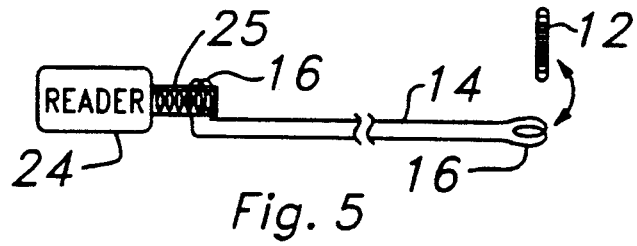
FIG. 5 shows a coupling coil/loop antenna arrangement which enhances the reading pattern of a reader in a different application according to the invention.

FIG. 5 shows yet another way that the read performance of a hand-held or stationary reader 24 is enhanced by the addition of the coupling coil 16 and the loop antenna 14 according to a preferred embodiment of the invention. For example, a transponder 12 may be located on an object which is inaccessible to reader 24 or simply out of the maximum read range of the reader antenna 25. Loop antenna 14 can be extended as long as necessary to create a reading pattern that will read transponder 12. Coupling coil 16 couples reader antenna 25 to loop antenna 14 to increase the range of the readers antenna 25 reading pattern.

Figure 6:
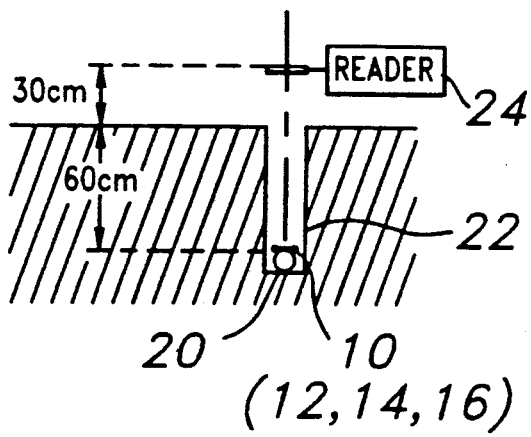
FIG. 6 shows one application of a preferred embodiment according to the invention.

An application of the first preferred embodiment of the transponder antenna configuration is in the tracking of buried pipes 20 as shown in FIG. 6. In this preferred embodiment, the antenna loop 14 comprises a single copper, enameled wire, 0.75 mm in diameter, 2.5 meters in length and 10 centimeters in width. Antenna loop 14 has a length to width ratio of 25 in this example. The antenna loop 14 is coupled to the transponder 12 via the coil 16 as shown in FIG. 1, and then laid upon the top of a plastic pipe 20 which is lying in a trench 22 in the ground, 20 cm wide and 70 cm deep as shown in FIG. 2. The hand-held reader 24 may be positioned anywhere along the length of the pipe 20, approximately 30 cm above the ground to facilitate a read, because the read distance is approximately one meter from the transponder/antenna configuration 10.

Figure 7:
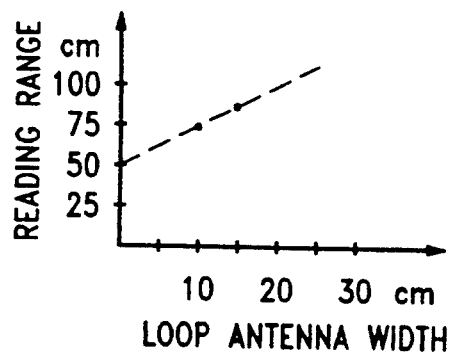
FIG. 7 shows a second application of a preferred embodiment according to the invention.

Another application of the first preferred embodiment consists of laying the transponder/antenna configuration 10, 3 cm above a concrete surface reinforced with steel. The steel is buried 5 cm into the concrete. FIG. 7 shows a graph of the transponder reading range versus the loop antenna width. As can be seen from the graph, as the loop antenna width increased, the transponder reading range also increased.

According to a preferred embodiment of the invention, the transponder/antenna configuration is easily applied to a more detailed example of an RF-ID system. For example, this RF-ID system has a transponder 12 with an identification code, which when attached to an object, identifies and discriminates one object from another. The coupling coil 16 is loosely coupled to the transponder 12, and the transponder/antenna configuration of FIG. 1 is attached to a particular pipe 20 in a pipe network, buried in the ground, as shown in FIG. 6. When a read is desired to locate a particular pipe 20, the hand-held interrogator 24 is held within the extended range of the transponder 12, and an interrogation pulse is transmitted. The transponder 12 receives, rectifies and stores the interrogation pulse energy, and transmits an identification code in response to an adequate amount of interrogation energy received. The hand-held interrogator 24 receives the identification code from the transponder 12 and processes the identification code as desired. One advantage of having the transponder/antenna arrangement 10 versus having just the transponder 12 attached to the pipe 20, is the greater flexibility in locating the hand-held interrogator 24 when performing a read of the transponder identification code. Due to the transponder/antenna arrangement 10, the hand-held interrogator can identify the pipe 20 anywhere along the length of pipe 20, instead of in the relatively immediate area of the transponder.

I claim:

1. An extended range transponder/interrogator RF-ID arrangement comprising:
    an interrogator for transmitting an interrogation signal;
    a transponder located on an object for generating a transponder response signal;
    an antenna located along one dimension of said object for receiving said interrogation signal and for transmitting said transponder response signal; and
    a coupling coil connected to said antenna for coupling said interrogation signal from said antenna to said transponder and for coupling said transponders response signal from said transponder to said antenna.

2. The arrangement according to claim 1, wherein said coupling coil is loosely coupled to said transponder.

3. The arrangement according to claim 1, wherein said coupling coil is wrapped loosely around said transponder.

4. The arrangement according to claim 1, wherein said antenna has a first dimension substantially greater than a second dimension.

5. The arrangement according to claim 1, wherein said antenna is disposed along said one dimension of said object, thereby increasing the radiation pattern of the transponder along said dimension of the object.

6. The arrangement according to claim 1, wherein said antenna is disposed in the direction perpendicular to said one dimension of said object, thereby increasing the radiation pattern of the transponder in the direction perpendicular to said dimension of the object.

7. The arrangement according to claim 1, wherein said object is buried in soil.

8. The arrangement according to claim 1, wherein said object is a pipe.

9. The arrangement according to claim 1, wherein said objet is a cable.

10. The arrangement according to claim 1, wherein said one dimension is the greatest dimension of said object.

11. An extended range transponder/interrogator RF-ID arrangement comprising:
- an interrogator for transmitting an interrogation signal;
- a transponder located on an object for generating a transponder response signal;
- an antenna extending away from said object for receiving said interrogation signal and for transmitting said transponder response signal; and
- a coupling coil connected to said antenna for coupling said interrogation signal from said antenna to said transponder and for coupling said transponders response signal from said transponder to said antenna.

12. The arrangement according to claim 11, wherein said coupling coil is loosely coupled to said transponder.

13. The arrangement according to claim 11, wherein said coupling coil is wrapped loosely around said transponder.

14. The arrangement according to claim 11, wherein said antenna has a first dimension substantially greater than a second dimension.

15. The arrangement according to claim 11, wherein said antenna is disposed along the direction of said antenna extension, thereby increasing the radiation pattern of the transponder along the direction of said antenna extension.

16. The arrangement according to claim 11, wherein said antenna is disposed in the direction perpendicular to the direction of said antenna extension, thereby increasing the radiation pattern of the tramsponder in the diraction perpendicular to the direction of said antenna extension.

17. The arrangement according to claim 11, wherein said object is buried in soil.

18. The arrangement according to claim 11, wherein said object is a pipe.

19. The arrangement according to claim 11, wherein said object is a cable.

20. An extended range transponder/interrogator RF-ID arrangement comprising:
- an interrogator for transmitting an interrogation signal, having an interrogation antenna;
- a transponder located on an object for generating a transponder response signal;
- an antenna extending away from said interrogation antenna for transmitting said interrogation signal and for receiving and transponder response signal; and
- a coupling coil for coupling said interrogation signal from said interrogator to said antenna and for coupling said transponders response signal from said antenna to said interrogator.

21. The arrangement according to claim 20, wherein said coupling coil is loosely coupled to said interrogation antenna.

22. The arrangement according to claim 20, wherein said coupling coil is wrapped loosely around said interrogator antenna.

23. The arrangement according to claim 20, wherein said antenna has a first dimension substantially greater than a second dimension.

24. The arrangement according to claim 20, wherein said antenna is disposed in the direction said antenna is extending away from said interrogation antenna, thereby increasing the radiation pattern of the transponder in the direction said antenna is extending away from said interrogation antenna.

25. The arrangement according to claim 20, wherein said antenna is disposed in the direction perpendicular to the direction said antenna is extending away from said interrogation antenna, thereby increasing the radiation pattern of the transponder in the direction perpendicular to the direction said antenna is extending away from said interrogation antenna.

26. The arrangement according to claim 20, wherein said object is buried in soil.

27. The arrangement according to claim 20, wherein said object is a pipe.

28. The arrangement according to claim 20, wherein said object is a cable.

29. An extended range transponder/interrogator RF-ID arrangement comprising:
- an interrogator for transmitting an interrogation signal and receiving an identification code, having an interrogation antenna;
- a transponder located on an object for generating an identification code in response to having received a predetermined amount of energy from said interrogation signal;
- an antenna extending away from said interrogation antenna for transmitting said interrogation signal and for receiving said transponder response signal; and
- a coupling coil for coupling said interrogation signal from said interrogator to said antenna and for coupling said transponders response signal from said antenna to said interrogator.

* * * * *